No. 840,838. PATENTED JAN. 8, 1907.
J. GEORGE & C. M. SHORTLE.
PROCESS FOR DRAWING SHEET GLASS.
APPLICATION FILED AUG. 19, 1904.
2 SHEETS—SHEET 1.
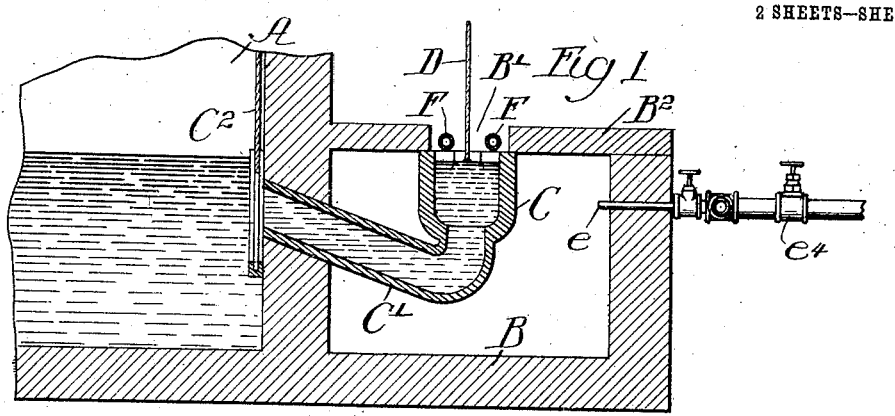
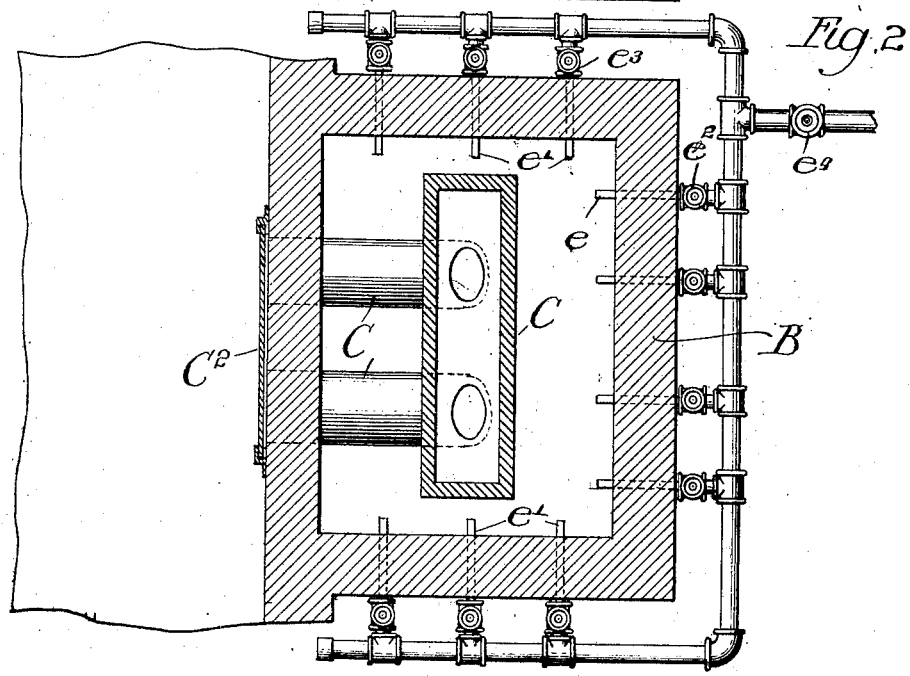
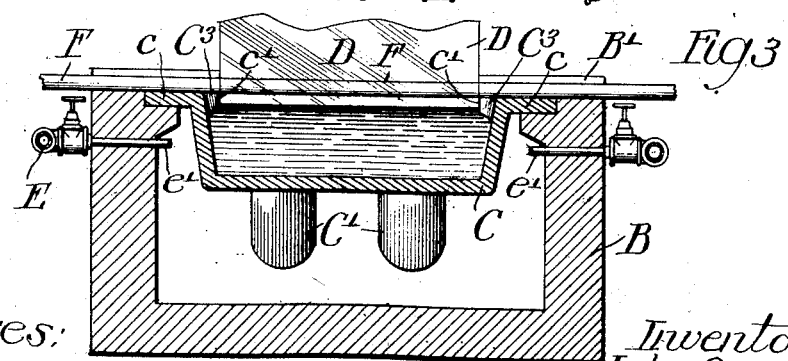
Witnesses:
Inventors
Jephus George
Christopher M. Shortle
by Poole + Brown
Ins. Attys

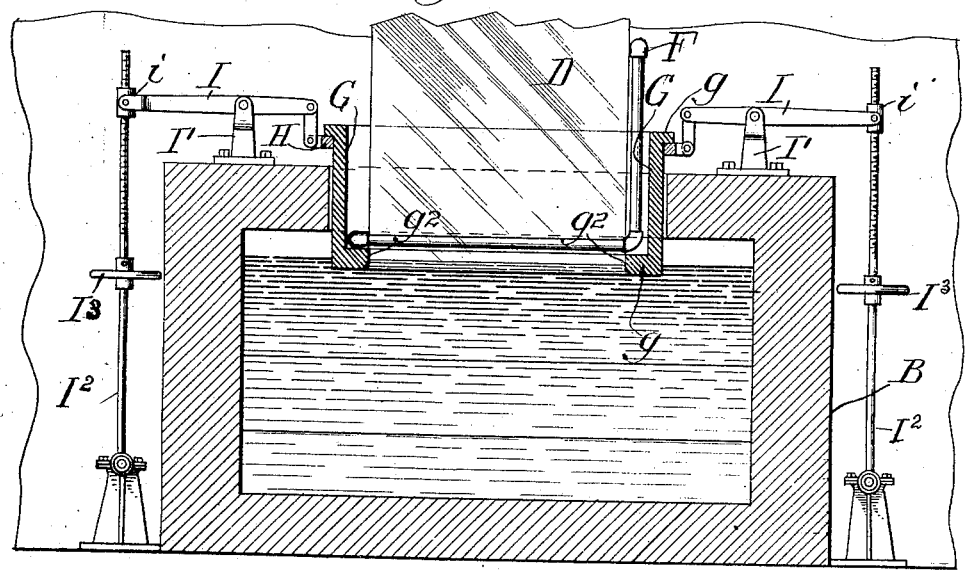
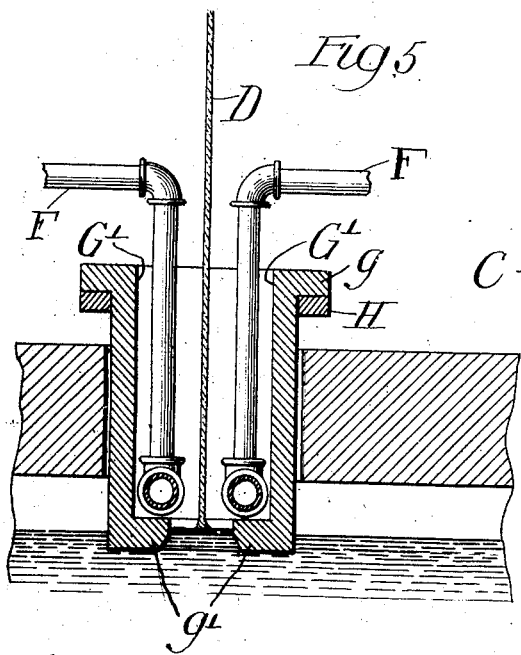
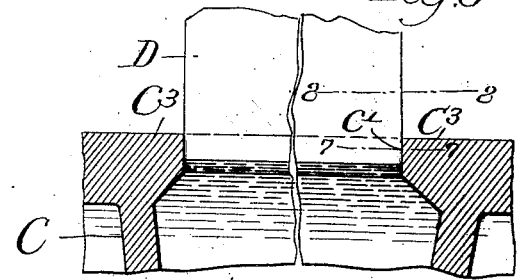
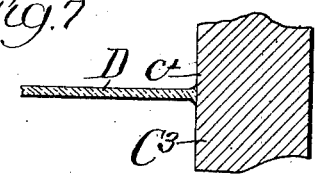
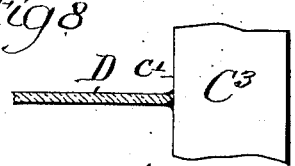

UNITED STATES PATENT OFFICE.

JAPHUS GEORGE, OF WILCOX, PENNSYLVANIA, AND CHRISTOPHER M. SHORTLE, OF BERNHARDS BAY, NEW YORK, ASSIGNORS, BY MESNE ASSIGNMENTS, TO NEWKIRK GLASS COMPANY, OF PIERRE, SOUTH DAKOTA, A CORPORATION OF SOUTH DAKOTA.

PROCESS FOR DRAWING SHEET-GLASS.

No. 840,838.     Specification of Letters Patent.     Patented Jan. 8, 1907.

Application filed August 19, 1904. Serial No. 221,431.

*To all whom it may concern:*

Be it known that we, JAPHUS GEORGE, a resident of Wilcox, in the county of Elk and State of Pennsylvania, and CHRISTOPHER M. SHORTLE, a resident of Bernhards Bay, in the county of Oswego and State of New York, citizens of the United States, have invented certain new and useful Improvements in Processes for Drawing Sheet-Glass; and we do hereby declare that the following is a full, clear, and exact description thereof, reference being had to the accompanying drawings, and to the letters of reference marked thereon, which form a part of this specification.

This invention relates to a novel process for drawing sheet-glass from molten glass. Said process follows in its general steps the process disclosed in the prior United States Letters Patent to George and Shortle, granted on the 7th day of February, 1899, No. 618,861, wherein the margin of a sheet-material bait is submerged in a body of molten glass and is thereafter drawn upwardly with a thin film of glass clinging thereto, which hardens as it emerges from the said body of molten glass to constitute a sheet of glass.

The object of the invention is to provide a process of drawing sheet-glass whereby is overcome the tendency of the sheet to narrow or taper at its side margins or the side margins of the sheet to become irregular in contour or thickness as the sheet is drawn upwardly, and thus produce a sheet of glass of uniform width and with smooth evenly-disposed side margins.

In the practice of our novel process the result above referred to is attained by maintaining the margins of the film of molten glass as it rises or is drawn upwardly from the body of molten glass in contact with vertical surfaces which rise from the said body of molten glass, the said vertical surfaces being heated to a temperature approximating that of the molten glass, so that the glass at the edges of the sheet or film will remain heated and will adhere or cling to said vertical surfaces while said margins are passing said surfaces, and the margins of the film or sheet will not harden until they have passed from or risen above the same. We have found that by drawing the sheet or film upwardly in contact with vertical surfaces which are maintained suitably heated the glass constituting the margins of said sheet or film cling to said surfaces in a manner to not only overcome the tendency of the sheet to narrow, but also prevents the margins from becoming irregularly thickened relatively to the body of the sheet.

The vertical surfaces upwardly in contact with which the margins of the sheet or film of glass are drawn may be the inner faces of the floater or pot from which the glass is drawn or may be projections from the walls of said floater or pot. The margins of the sheet and the said vertical surfaces are kept suitably heated to maintain the glass at the margins of the sheet or film at such consistency that it will adhere to the said vertical surfaces. Such heat may be derived from the natural arrangement of the furnace, or specially-arranged auxiliary heating means may be employed.

In the drawings we have shown a form of apparatus which embraces as a part thereof a self-feeding drawing-pot, which is arranged in the nose of the furnace and is supplied with molten glass from the furnace through specially-constructed conduits or passages that open in the pot at the bottom thereof and have shown an apparatus in which the sheet is drawn directly from the molten glass in the nose of the furnace.

As shown in the drawings, Figure 1 is a fragmentary sectional view of a furnace and its nose, showing therein a pot from which the glass sheets are drawn, the means for feeding glass to said pot from the furnace, and means for maintaining the molten glass in the feeding-pot heated. Fig. 2 is a horizontal section taken just beneath the cover or arch of the nose. Fig. 3 is a vertical section taken longitudinally through the melting-pot. Figs. 4 and 5 illustrate a construction designed for drawing the sheets directly from the molten glass in the nose of the furnace. Fig. 6 is an enlarged detail section, partly broken away, illustrating more clearly the relation of the margins of the sheet to the vertical surface upwardly in contact with which they are drawn. Figs. 7 and 8 are horizontal sections taken on lines 7 7 and 8 8, respectively, of Fig. 6.

First referring to the apparatus shown in Figs. 1 to 3 of the drawings for carrying out our novel process, A designates a furnace in which the glass is melted, and B designates the nose of the furnace, provided in its top with a slot or draft-opening B'. C designates a pot located within the nose of the furnace beneath and in line with the draft-opening of the nose and from which the glass is drawn to form the sheet D. The top of said pot is shown as located at the level of the top of the side walls of the furnace, and the nose is covered by a top wall or arch $B^2$, that extends in overlapping relation over to the top margins of the pot, so as to prevent radiated heat from the interior of the nose acting directly upon the sheet as it is drawn from the pot. As herein shown, the pot is supported upon the end walls of the nose by means of lips $c$ $c$ at its ends, which rest on said end walls. The top wall or arch $B^2$ of the nose and the sustaining-lips $c$ at the ends of the pot shield the sheet D from the direct heat in the nose of the furnace. The molten glass is fed to said pot from the furnace through the medium of suitable conduits C', which lead from the furnace below the level of the molten glass therein and enter the bottom of the pot. The flow of molten glass through said conduits may be controlled by the use of a suitable valve $C^2$, made of refractory material and sliding in suitable guides in the furnace-wall. The glass in the drawing-pot is kept suitably heated to maintain the same at a drawing or flowing consistency by means of flames from the branches $e$ $e'$ of a gas-pipe E, the branches $e$ extending through the side wall of the nose, while the branches $e'$ extend through the end walls thereof. The branch pipes $e$ $e'$ are provided with throttling and regulating valves $e^2$ $e^3$, and the pipe E is also provided with a cut-off valve $e^4$. F F designate pipes which are filled with a circulating cooling medium which acts to absorb heat from the base of the forming sheet D as the latter is drawn upwardly from the molten glass within the drawing-pot, and thereby cool and give permanent form to the sheet immediately upon its emergence from the molten glass.

The pot is made of a length (inside measurement) slightly greater than that of the bait by which the drawing operation is begun, so as to allow the lower edge of the bait to be lowered freely into and withdrawn from the pot. The vertical surfaces $c'$ in contact with which the margins of the film or sheet of glass are drawn upwardly may be the inner faces of the end walls of the pot, or said end walls of the pot may be provided at their tops with inwardly-extending projections $C^3$, on the inner ends of which are formed said surfaces. Said vertical surfaces extend a distance above the level of the molten glass in the pot and are parallel with each other. Said surfaces and the margins of the sheet are sufficiently heated to maintain the side margins of the film sheet at such a consistency as to cling to said vertical surfaces while passing the same, thereby holding or maintaining the width of the sheet and producing margins of non-varying width and of the same width as that of the sheet. The proper graduation of temperature to maintain the said vertical surfaces and margins of the sheet thus heated is produced by graduating the supply of the burning mixture delivered through the branch pipes and directed upon or toward the end wall of the pot. As soon as the margins of the sheet leave said surface of the end walls of the pot they are hardened sufficiently to prevent contraction of the sheet. The sheet passes thence upwardly into a suitable tempering or annealing chamber located above the nose of the furnace. (Not herein shown.)

In Fig. 7 is illustrated the manner in which the margins of the film or forming sheet follows or clings to the end vertical surfaces of the pot above the body of molten glass from which the sheet is drawn. Fig. 8 illustrates the form which the margins of the sheet assumes as soon as it leaves or rises above said vertical surfaces, said margins becoming transversely rounded, but being sufficiently cooled at this time to maintain the width of the sheet.

In Figs. 4 and 5 we have shown a construction wherein the sheet is drawn directly from a mass of molten glass contained in the nose B of the tank. In this construction we employ in the draft-opening of the nose a device generally like a floater, with the exception that it is fixed to the nose and is provided with means whereby it is positively raised and lowered to correspond with the level of the molten glass. Said construction consists of connected vertical end and side walls G G', respectively, which dip at their lower edges into the molten glass contained in the nose and rise at their upper edges above the level of the top wall of the nose. The walls of the floater are provided at their lower edges with inwardly-extending flanges $g$ $g'$. The flanges $g'$ of the side walls constitute ledges on which are supported cooling-pipes F. The inner faces of the flanges $g$ of the end walls above the molten glass constitute the vertical surfaces $g^2$, against which the margins of the rising sheet or film cling or adhere, said surfaces $g^2$ corresponding to the surfaces $c'$ of the pot shown in the previously-described figures. The walls G G' protect the rising sheet from the direct radiation of the mass of molten glass. The means for maintaining heated the glass in the nose are not herein shown, but may be of any type heretofore employed or which is suitable for that purpose. Said floater is supported in a surrounding open frame H by means of flanges $g$ on the upper margins of the walls thereof that rest on said frame. The frame H is raised and lowered to raise and lower the floater by means of levers I, prvoted between their ends to standards I', rising from the upper wall of the nose and connected at their inner ends with the frame and piovided at their outer ends with pivoted sleeves $i$, which are screw-threaded to receive vertical rotative screw-shafts $I^2$. Said shafts are provided with hand-wheels $I^3$. By rotation of the shafts $I^2$ the levers are oscillated on their axes and the floater raised and lowered, depending upon the direction of rotation of the shaft.

We claim as our invention—

1. The improvement in the process of drawing glass sheets from a body of molten glass which consists in maintaining the margins of the sheet or film as it is drawn upwardly from the body of molten glass in contact with vertical surfaces rising from the body of molten glass while maintaining said surfaces and the margins of the sheet or film at such temperature as to cause said margins to cling to said surfaces in passing the same.

2. The improvement in the process of drawing glass sheets from a body of molten glass which consists in protecting the body of the formed sheet from the direct action of radiated heat and maintaining the margins of the sheet or film as it is drawn upwardly from the body of molten glass in contact with vertical surfaces rising from the body of molten glass while maintaining said surfaces and the margins of the sheet or film at such temperature as to cause said margins to cling to said surfaces in passing the same.

In testimony that I claim the foregoing as my invention I affix my signature, in the presence of two witnesses, this 18th day of July, A. D. 1904.

JAPHUS GEORGE.

Witnesses:
F. W. ALDRICH,
S. G. LATTA.

In testimony that I claim the foregoing as my invention I affix my signature, in the presence of two witnesses, this 29th day of July, A. D. 1904.

CHRISTOPHER M. SHORTLE.

Witnesses:
M. M. GALLAGHER,
FRANK PEACHIN.